Patented Sept. 10, 1935

2,013,699

UNITED STATES PATENT OFFICE 2,013,699

PROCESS FOR PRODUCING HYDROGEN AND CARBON BLACK

Ralph S. Richardson, Teaneck, N. J., assignor to Chemical Construction Corporation, New York, N. Y., a corporation of Delaware No Drawing. Application October 10, 1930, Serial No. 487,919

10 Claims. (Cl. 23—212)

My invention relates to the thermal decomposition of hydrocarbons with steam, and has for its object, among other things, the production of a gas rich in hydrogen and at the same time producing a valuable carbon black.

The process of producing carbon black by the thermal decomposition of hydrocarbons, or by the incomplete combustion of hydrocarbons with air, is well known. Likewise it is known that the interaction of hydrocarbons with an excess of steam results in the production of a gas containing hydrogen and carbon oxides. These reactions for methane may be written:

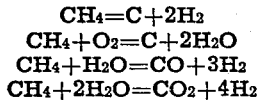

$$CH_4 = C + 2H_2$$
$$CH_4 + O_2 = C + 2H_2O$$
$$CH_4 + H_2O = CO + 3H_2$$
$$CH_4 + 2H_2O = CO_2 + 4H_2$$

I have discovered that by properly controlling the quantity of steam mixed with the hydrocarbons, in which such hydrocarbon-steam mixtures preferably vary from one to three volumes of steam to one volume of hydrocarbon, I can obtain by thermal decomposition a gas rich in hydrogen and carbon oxides and at the same time a valuable carbon black.

One advantage of my improved method lies in the fact that the quantity of steam used can be considerably reduced from that required for complete decomposition of the hydrocarbons without production of carbon.

This reduction in the quantity of steam is important, not only on account of the cost of the steam, but also because large excesses of steam are accompanied by large heat losses represented by the sensible heat of the excess steam leaving the cracking apparatus.

Another advantage of my improved method lies in the fact that the proportion of steam to hydrocarbon can be so varied as to give an easy method of controlling the relative amounts of the gaseous and carbon products and the quality of the gas produced.

The reaction is too complicated to give specific examples for varying proportions of steam and hydrocarbons, chiefly because the ratio of the production depends not only on the steam, but also on the nature of the hydrocarbons, temperatures, as well as the details of the apparatus employed.

Generally speaking, however, I have found that decreasing the steam results in a higher production of carbon, whereas increasing the steam results in a lower production of carbon and in an increased production of gas. Without the addition of any steam, the resultant gas consists mainly of hydrogen and the carbon black is produced in the greatest quantity. With the use of a large excess of steam, the gas produced contains hydrogen and carbon oxides and the carbon production is negligible, where the ratio of steam to methane is 10:1 by volume.

An example illustrating the results obtained by controlling the mixture so that it contains two volumes steam to one volume methane, I find there are produced about 2 lbs. carbon black and 3760 cu. ft. of cracked gas per 1000 cu. ft. of methane. This cracked gas has substantially the following analysis:—

|  | Percent |
|---|---|
| Hydrogen | 75 |
| Carbon monoxide | 24 |
| Methane | 1 |
|  | 100 |

I have also discovered that a gas suitable for the production of synthetic ammonia may be made by this improved method, if during the thermal decomposition of the hydrocarbons, sufficient nitrogen is introduced to give with the carbon black a gas, which, after purification by known methods, contains one part nitrogen to three parts of hydrogen. The nitrogen may be introduced as nitrogen, or mixed with oxygen either as air or oxygen enriched air.

I have found also in the production of gases for ammonia synthesis that often it is desirable to introduce the nitrogen in a second step of the reaction, that is to say: first to decompose the hydrocarbons so as to produce the hydrogen carbon oxide gas mixture and carbon black; and secondly to burn the gases so produced with sufficient quantity of air or oxygen-enriched air that the resultant gases after purification contain nitrogen and hydrogen in the proper proportions for the ammonia synthesis.

For the synthesis of ammonia, this second method is particularly valuable inasmuch as it is difficult to obtain complete decomposition of the hydrocarbons with steam alone. Usually some of the hydrocarbon is left undecomposed in the effluent gases and the removal of this undecomposed fraction complicates the subsequent process of purification. However, if the gases resulting from the decomposition which will contain some small amount of hydrocarbons are burned with air in the presence of a catalyst, or in a bed of refractory material at temperatures around 1400° C., such undesired hydrocarbon is removed in this burning step so completely from the gas mixture that no inconvenience is experienced in purifying and using the gases for the ammonia synthesis.

The purification of these gases for the ammonia synthesis can be accomplished in a variety of known methods. One approved method is to oxidize carbon monoxide with steam, producing carbon dioxide and an equivalent volume of hydrogen. The carbon dioxide is removed by scrubbing with water under pressure and the traces of carbon monoxide are taken out by scrubbing with ammoniacal cuprous solution.

For the synthesis of methanol ($CH_3.OH$), a gas is required in which for every volume of carbon monoxide or carbon dioxide there is present two or three volumes of hydrogen respectively. Gas suitable for methanol synthesis and carbon black can be produced by my method by adding a controlled amount of oxygen to the hydrocarbon before or during the decomposition. A gas of analysis suitable for methanol synthesis together with carbon black can be produced also by adding carbon monoxide or carbon dioxide in controlled amounts to the hydrocarbon before, during, or after the decomposition.

My process can be carried out in a variety of apparatus with, or without, a catalyst, without sacrificing the advantages attained by using my methods.

I claim as my invention:—

1. In a process for producing hydrogen from hydrocarbons by thermal decomposition of methane with steam, the steps which comprise mixing methane and steam in the ratio of 1 to 2 by volume, and heating the mixture sufficiently to effect thermal decomposition with simultaneous production of a gas containing about 75% hydrogen and about 24% carbon monoxide and also carbon black.

2. A process for producing simultaneously hydrogen-containing gases and carbon products including carbon black which consists in mixing hydrocarbon gas and steam, heating the mixture sufficiently to effect thermal decomposition thereof, and maintaining the proportion of hydrocarbon to steam between the limits of one to three volumes of steam to one volume of hydrocarbon, whereby to control the relative amounts of gases and carbon black.

3. In a process for producing nitrogen-hydrogen gases suitable for the synthesis of ammonia, the steps which comprise mixing hydrocarbons and steam in the ratio of 1:2 by volume, and heating the mixture sufficiently to effect thermal decomposition in the presence of air with the simultaneous production of nitrogen-hydrogen gases and carbon black.

4. In a process for producing nitrogen-hydrogen gases suitable for the synthesis of ammonia, the steps which comprise mixing hydrocarbons and steam, and heating the mixture sufficiently to effect thermal decomposition to produce hydrogen carbon-dioxide gas mixture and carbon black, and then burning the gases so produced with air to obtain the nitrogen-hydrogen gases.

5. In a process for producing nitrogen-hydrogen gases suitable for the synthesis of ammonia, the steps which comprise mixing hydrocarbons and steam, and heating the mixture sufficiently to effect thermal decomposition to produce hydrogen carbon-oxide gas mixture and carbon black, and then burning the gases so produced with oxygen-enriched air to obtain the nitrogen-hydrogen gases.

6. In a process for producing nitrogen-hydrogen gases suitable for the synthesis of ammonia, the steps which comprise mixing hydrocarbons and steam, and heating the mixture sufficiently to effect thermal decomposition to produce hydrogen carbon-oxide gas mixture and carbon black, and then burning the gases so produced with controlled amounts of air to obtain the nitrogen-hydrogen gases.

7. In a process for producing nitrogen-hydrogen gases suitable for the synthesis of ammonia, the steps which comprise mixing hydrocarbons and steam in a ratio of one volume of hydrocarbons to from one to three volumes of steam, heating the mixture sufficiently to effect thermal decomposition thereof to produce hydrogen carbon-oxide gas mixture and carbon black, burning the gases so produced with air to obtain nitrogen-hydrogen gases, and purifying said gases for the ammonia synthesis.

8. In a process for producing carbon oxide-hydrogen gases suitable for the synthesis of methanol, the steps which comprise mixing hydrocarbons and steam in the ratio of 1:2 by volume with controlled amounts of oxygen, heating the mixture sufficiently to effect thermal decomposition with production of carbon oxide-hydrogen gases and carbon black, and recovering said gases for the methanol synthesis.

9. In a process for producing carbon oxide-hydrogen gases suitable for the synthesis of methanol, the steps which comprise mixing hydrocarbons and steam in the ration of 1:2 by volume with controlled amounts of carbon oxide gas, heating the mixture sufficiently to effect thermal decomposition with production of carbon oxide-hydrogen gases and carbon black, and recovering said gases for the methanol synthesis.

10. In a process for producing carbon oxide-hydrogen gases suitable for the synthesis of methanol, the steps which comprise mixing hydrocarbons and steam in the ratio of 1:2 by volume, heating the mixture sufficiently to effect thermal decomposition with production of carbon oxide-hydrogen gases and carbon black, and adding after said decomposition carbon oxide gases in controlled amounts to obtain a gas mixture for the methanol synthesis.

RALPH S. RICHARDSON.